(No Model.)

J. C. MARTIN.
APPARATUS FOR GRINDING WHITE LEAD AND OTHER MATERIALS.

No. 286,720. Patented Oct. 16, 1883.

INVENTOR

John Cowdery Martin

WITNESSES
William Henry Beck
Stephen Edward

UNITED STATES PATENT OFFICE.

JOHN C. MARTIN, OF RICHMOND, COUNTY OF SURREY, ENGLAND.

APPARATUS FOR GRINDING WHITE LEAD AND OTHER MATERIALS.

SPECIFICATION forming part of Letters Patent No. 286,720, dated October 16, 1883.

Application filed December 1, 1882. (No model.) Patented in England March 18, 1879, No. 1,054; in France September 18, 1879, No. 132,767; in Germany September 21, 1879, No. 10,209, and in Belgium September 26, 1879, No. 49,401.

*To all whom it may concern:*

Be it known that I, JOHN COWDERY MARTIN, a subject of the Queen of Great Britain, and residing at Richmond, in the county of Surrey and Kingdom of Great Britain, have invented certain new and useful Improvements in Apparatus for Grinding White Lead and other Materials, (for which I have obtained Letters Patent in Great Britain, dated March 18, 1879, No. 1,054; in France, dated September 18, 1879, No.132,767; in Belgium, dated September 26, 1879, No. 49,401; and in Germany, dated September 21, 1879, No. 10,209;) and I do hereby declare that the following is a full, clear, and exact description of the invention, which will enable others skilled in the art to which it appertains to make and use the same, reference being had to the accompanying drawings, and to the letters or figures of reference marked thereon, which form a part of this specification.

This invention consists of the following improved arrangements in connection with apparatus for grinding white lead and other materials in a dry condition. When the ordinary edge-runner stones are employed for this purpose, the dust produced being extremely poisonous and deleterious to health, I inclose these edge-runners within a casing and avoid the use of manual labor in presence of the poisonous lead-dust by making the apparatus nearly self-acting.

Figure 2:
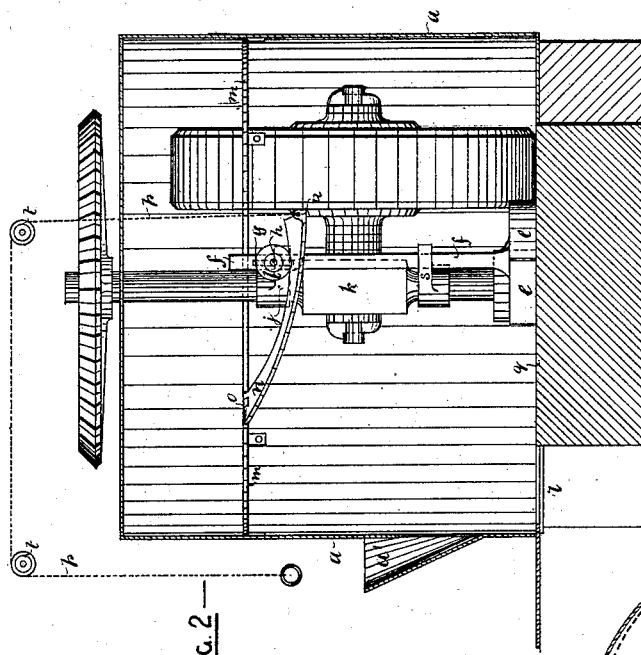
Figure 3:
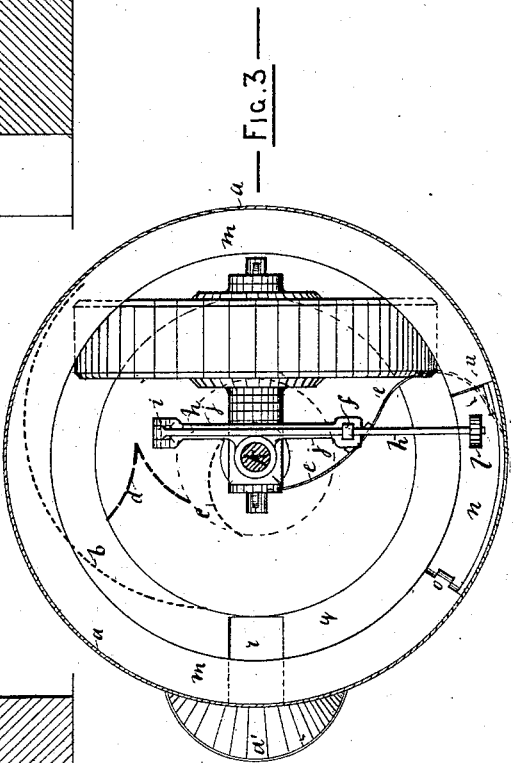
Figure 1:
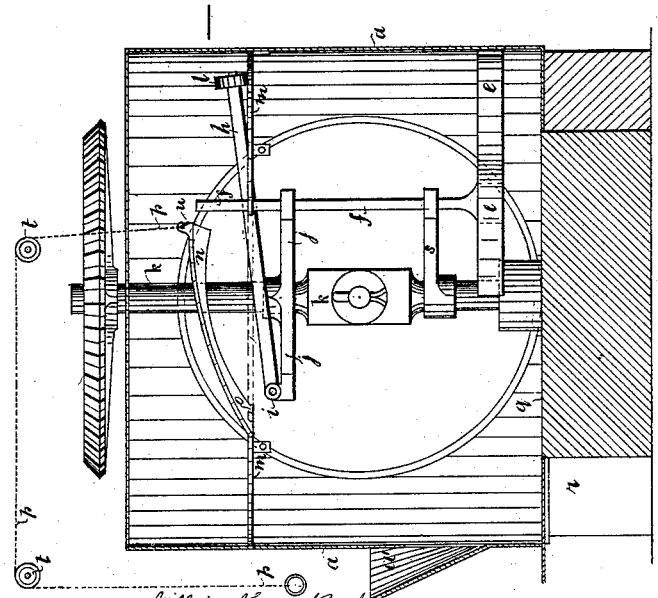

Figure 1 shows an edge-runner inclosed as described, but with half of the casing removed, in order to show the action of the apparatus more clearly. Fig. 2 is a similar view, but with the edge-runner and apparatus connected therewith moved round a quarter-revolution. Fig. 3 is a sectional plan.

The material to be ground is fed in through the opening $a'$ in the side of the casing $a$, which opening may be provided with a cover, or may form part of a chute, or otherwise. I keep the material well under the stone or stones by fitting it on them with the ordinary scrapers, taking their motion from the vertical shaft, and arranged in any suitable or convenient manner—such, for example, as shown in Fig. 3 by the dotted lines $b\ c\ d$, in which the scrapers $b$ and $c$ collect the material into a heap in the path of the stone, ready for grinding, and the scraper $d$ plows up and separates the material after the stone has passed over it; but I make no claim to this arrangement of feeding-scrapers, as it is already well known. After the material has been sufficiently ground or mixed, I throw it out by means of a suitably-curved scraper, $e$, attached to a rod, $f$, with a slot, $g$, formed in the upper part thereof, through which passes the lever $h$. This rod $f$ passes through holes in the plates $j$ and $s$, which plates are fixed to and revolve with the central shaft, $k$. The lever $h$ is secured at one end by a hinge or joint, $i$, to the plate $j$, and the other end is fitted with a wheel or friction-roller, $l$, which runs on and is supported by a circular plate or tramway, $m$, fixed outside the stone or stones to the inside of the casing $a$, or in any other convenient position. A part, $n$, of this tramway is hinged at $o$, and is caused to rise or fall by means of a chain, rod, or cord, $p$, passing over suitable guide-pulleys, $t$, through the casing $a$, and attached to the eye $u$ on the hinged part $n$ of the tramway $m$. The tramway $m$ is shown complete in all of the figures of the drawings, and the hinged part $n$ is shown raised in Fig. 1, lowered in Fig. 2, and level with the rest of the tramway in Fig. 3. When the end of the hinged part $n$ is lifted by means of the chain $p$, as shown in Fig. 1, an opening or gap is formed in the circular tramway, and the wheel or friction-roller $l$, with its lever $h$, on reaching this opening falls through and passes under the tramway. The lever $h$ in falling also carries with it the rod $f$ and scraper $e$, which latter then rests on the bed $q$ of the apparatus, throwing out, as it travels round with the stone or stones, the material through an opening, $r$, provided for that purpose in the usual way. When this is effected the hinged part $n$ of the plate or tramway $m$ is lowered by means of the chain $p$ and forms an inclined plane, as shown in Fig. 2, which the wheel or friction-roller $l$, with its lever $h$, ascends on coming in contact with it, whereby the rod $f$ and the scraper $e$ are lifted into their original position above the material on the bed $q$. The hinged part $n$ being then raised by means of the chain $p$, as shown in Fig. 1, a pin is inserted through the casing $a$ in such a position as that when the hinged part $n$ is lowered it shall be retained by the said pin at the same level as the rest of the tramway. The wheel or friction-roller $l$ then travels round and round on the tramway, and the scraper $e$ is thus kept raised above the material on the bed $q$ until the hinged part $n$ is again raised, as in Fig. 1.

Inclosed edge-runners fitted with the scrapers and apparatus herein described may be used for mixing or grinding materials other than white lead, the dust or fumes of which it is desired shall not escape into the atmosphere.

I claim—

In inclosed edge-runner grinding apparatus, the combination of the circular plate or tramway $m$, having the hinged part $n$, with the lever $h$, provided with a friction-roller, $l$, running on the said tramway, the rod $f$, and the discharging-scraper $e$, the whole operating as hereinbefore described, and shown in the drawings, and for the purpose set forth.

JOHN COWDERY MARTIN.

Witnesses:
WILLIAM HENRY BECK,
139 Cannon Street, London.
STEPHEN EDWARD GUNYON,
13 Farleigh Road, Stoke-Newington, London.